Oct. 24, 1939.  B. C. SKINNER  2,177,129
FRUIT CURING ROOM
Filed Nov. 22, 1937
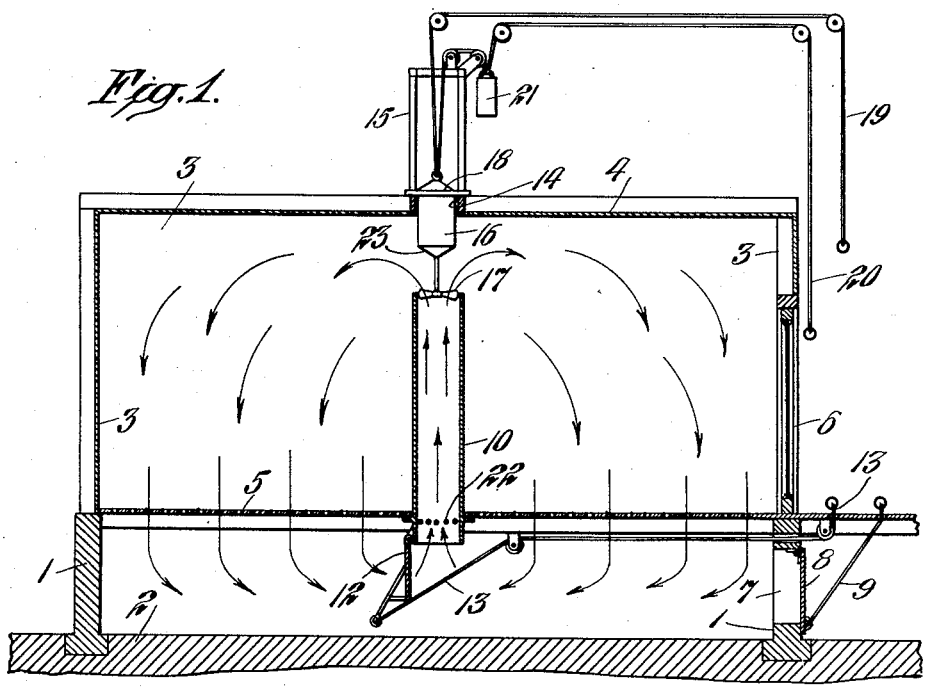
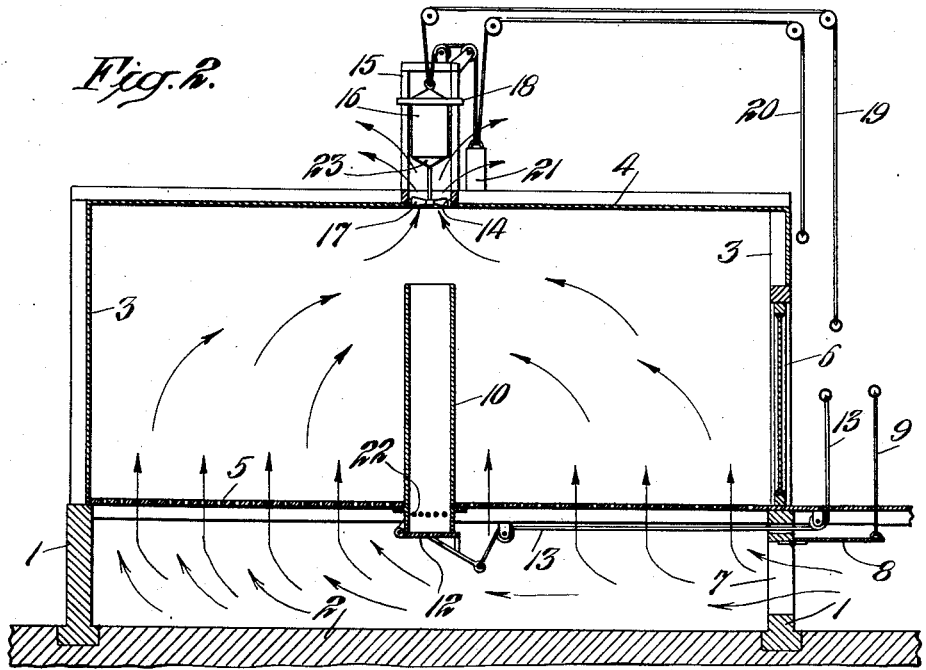
INVENTOR
*Bronson C. Skinner*
BY *Sager & Malcolm*
ATTORNEYS Patented Oct. 24, 1939

2,177,129

UNITED STATES PATENT OFFICE 2,177,129

FRUIT CURING ROOM

Bronson C. Skinner, Dunedin, Fla., assignor to said Bronson C. Skinner, as trustee for Vivien Skinner, Bruce Weller Skinner, Benjamin Lee Skinner, and Jacques Bronson Skinner Application November 22, 1937, Serial No. 175,788

5 Claims. (Cl. 99—271)

This invention relates to curing citrus fruits and has for its object to provide an improved apparatus for imparting a desirable natural color to such fruits for the purpose of enhancing their appearance and salability.

It is a common practice to subject citrus fruits such as oranges, grapefruit, etc., to a curing process for the purpose of improving their color preparatory to shipping the fruit to market, as it is well known that such fruits are bought almost entirely "by the eye" and that growers are never able to obtain as high a price for off-color fruit as for fruit in which the color is attractively and brilliantly developed.

The commonly accepted method of curing citrus fruits to enhance their color is to subject them to the action of a reagent such as ethylene gas, the usual practice being to admit the gas under controlled conditions to special coloring rooms built in packing houses or in the fruit groves. Most of the modern fruit coloring rooms in use today are of the type employing a false floor upon which the fruit boxes are stacked. This false floor is provided with openings, usually in the form of narrow slots between the floor planks, the planks being laid diagonally so that no slot can ever be entirely obstructed by the fruit boxes and also for the purpose of facilitating trucking across the slots. The ethylene gas or other reagent is admitted to the room under controlled conditions of temperature and humidity, and is circulated through the room and false floor in such a way that the gas, at the proper temperature and containing the proper amount of fresh air and moisture, comes in contact with all the fruit in all parts of the room.

The air in coloring rooms of the above type becomes quite foul after a period of time, and the usual practice is to open the doors at both ends of the room every six hours and allow the room to air out for a period of about an hour. The rapidity of this ventilation of course, depends to a large extent upon the amount of wind which may be blowing in a direction to force the fresh air in one door and out the other, and it also depends a great deal upon the difference between the temperature of the fruit in the room and the temperature of the air outside the room. This dependence upon natural ventilation always results in the loss of considerable time and therefore increases the cost of the treatment, and natural ventilation is furthermore far from thorough.

My invention provides a specially constructed fruit coloring room of the above type which makes it possible to obtain a much quicker and more uniform and thorough ventilation than heretofore, with resulting saving in time and expense as well as in a marked stimulation of the natural coloring process which improves the texture and other desirable qualities of the fruit. In carrying out my invention I employ a room having a slotted false floor of the type described above, and provided with a fan and a special arrangement of ventilating doors which may be regulated either to cause the circulation of the reagent through the room during the coloring operation or to cause a flood of fresh air to circulate through the room in a direction to sweep it clear of the foul gases in a fraction of the time required by previous methods of ventilation.

The various features and advantages of the invention will be described in connection with the accompanying drawing, in which:

Fig. 1 is a vertical sectional view of a coloring room embodying the invention as it appears during the coloring operation; and Fig. 2 is a similar view showing the position of the fan, doors, etc. while the room is being ventilated.

The coloring room shown in the drawing is built upon solid walls 1 resting upon the ground or upon a suitable foundation 2, and is provided with the usual four walls 3, roof 4 and a slotted false floor 5 which is mounted a suitable distance above the foundation 2. As illustrated, one of the walls is provided with a door 6 for the admission of the boxes of fruit which are usually carted in on trucks, it being understood that a similar door may be provided in the opposite wall or elsewhere if desired.

The bottom wall 1 beneath the door 6 has an inlet opening 7 to permit fresh air to be drawn into the space beneath the floor 5, and this opening 7 is provided with a hinged door 8 which may be opened outwardly by means of a cable 9. At the center of the room a cylindrical stack 10 extends upwardly through the floor 5 to a point adjacent the top of the room, this stack having its lower end projecting beneath the floor 5 and provided with a hinged door 12 controlled by a cable 13. The roof 4 has a circular outlet passage 14 in the center, directly above the stack 10, and a vertical frame 15 mounted on top of the roof 4 serves as a guide or track for a vertically movable carriage or housing 16 carrying fan 17 which is adapted to be raised and lowered in said passage 14. In the embodiment illustrated, the fan carriage 16 carries a shield 18 which runs on the guides 15 and is adapted to seat on and close the passage 14 when the fan 17 is in the lowered position adjacent the top of stack 10 as shown in Fig. 1.

In the embodiment illustrated, the carriage 16 is attached to a cable 19 which terminates adjacent the door 6 at the front of the room for the purpose of raising the fan carriage. A second cable 20 carrying an intermediate counterweight 21, and also terminating at the front of the room, is also attached to the carriage 16 for the purpose of lowering same. In order to raise the fan 17 the operator pulls on cable 19, while to lower the fan the operator pulls on cable 20 which raises counterweight 21 and permits the fan to drop to the lower position illustrated in Fig. 1. All the cables 9, 13, 19 and 20 run to the front of the room adjacent door 6 so that the operator can perform all necessary operations from this convenient position.

The reagent employed in the coloring operation, such as ethylene gas, as well as the steam and water employed in the coloring operation, are supplied to the room through various jets 22 adjacent the bottom of stack 10, any suitable or usual means being employed for controlling and regulating the gas, steam and water as is well understood in the art. During the coloring operation the parts are in the position shown in Fig. 1, the main door 6 being closed, door 8 closing the air inlet 7, the door 12 at the bottom of stack 10 being opened, and the fan 17 being lowered to the position shown adjacent the top of stack 10 in which position shield 18 closes the outlet passage 14. Under these conditions, fan 17 causes a continuous recirculation of the gases which pass upwardly through stack 10, then throughout all parts of the room and in contact with the surfaces of the entire charge of fruit, and thence downwardly through the slotted floor 5 to the bottom of stack 10, as indicated by the arrows in Fig. 1. The bottom of the fan carriage 16 is preferably tapered as indicated at 23 for the purpose of diverting the stream of gas as indicated by the arrows.

When it is desired to ventilate the room, as is necessary periodically, the operator simply turns off the jets 22 and then pulls on the cables 9, 13 and 19, the main door 6 to the room remaining closed. Cable 9 opens door 8 of the fresh air inlet 7, while cable 13 closes door 12 at the bottom of stack 10, and cable 19 raises the fan 17 into the outlet passage 14 in roof 4, thereby causing fresh air to be drawn through opening 7 and sucked up through the fruit in all parts of the room and out through the passage 14 in the roof, as indicated by the arrows in Fig. 2, thereby insuring a very quick and thoroughly uniform ventilation.

The foregoing embodiment of my invention has been described solely for purposes of illustration and not for purposes of limitation, it being evident that various changes may be made in the details of construction and method of operation herein disclosed without departing from the scope and spirit of the invention as defined in the appended claims.

The invention claimed is:

1. A fruit curing room having a false floor containing a multiplicity of openings permitting the circulation of gases therethrough, an air inlet opening in said room beneath said floor, a stack extending through said floor and projecting upwardly toward the roof of said room, an outlet passage for air in said roof above said stack, means for closing said inlet opening and said outlet passage, means for admitting curing fluid to said room, and a fan adjacent said stack and said outlet passage for recirculating gases through said stack and said room when said inlet opening and outlet passage are closed and for circulating air from said inlet opening through said floor and room and out through said outlet passage when said inlet opening and outlet passage are open.

2. A fruit curing room having a false floor containing a multiplicity of openings permitting the circulation of gases therethrough, an air inlet opening in said room beneath said floor, a stack extending through said floor and projecting upwardly toward the roof of said room, an outlet passage for air in said roof above said stack, a fan movable up and down in said passage and adapted to create an upward draft through said stack when lowered and an upward draft through said outlet passage when raised, means associated with said fan for closing said outlet passage when said fan is lowered, means for admitting curing fluid to said room, a door for said air inlet opening adapted when closed to permit circulation of gases in said room through said floor and stack, and a door for closing said stack to permit the circulation of air from said air inlet opening through the floor and out through the outlet passage in said roof when said fan is raised.

3. A fruit curing room having a false floor containing a multiplicity of openings permitting the circulation of gases therethrough, an air inlet opening in said room beneath said floor, a stack extending through said floor and projecting upwardly to a point adjacent the roof of said room, an outlet passage for air in said roof above said stack, a fan carriage movable up and down in said passage and carrying a fan adapted to create an upward draft through said stack when lowered and an upward draft through said outlet passage when raised, a shield on said carriage adapted to close said outlet passage when said carriage is lowered therein, means for admitting curing fluid to said room, a door for said air inlet opening adapted when closed to permit recirculation of gases in said room through said floor and stack, a door for closing the bottom of said stack to permit the circulation of air from said air inlet opening through the floor and out through the outlet passage in said roof when said fan carriage is raised, means for raising and lowering said fan carriage, and means for operating said doors.

4. A fruit curing room having a false floor containing a multiplicity of openings permitting the circulation of gases therethrough, an air inlet opening in said room beneath said floor, a stack extending through said floor and projecting upwardly to a point adjacent the roof of said room, an outlet passage for air in said roof above said stack, vertical guides on said roof adjacent said outlet passage, a fan carriage movable on said guides and carrying a fan adapted to create an upward draft through said stack when lowered and an upward draft through said outlet passage when raised, a shield on said carriage adapted to close said outlet passage when said carriage is lowered therein, means for admitting curing fluid to the interior of said stack, a door for said air inlet opening adapted when closed to permit recirculation of gases in said room through said floor and stack, a door for closing the bottom of said stack to permit the circulation of air from said air inlet opening through the floor and out through the outlet passage in said roof when said fan carriage is raised, means for raising and lowering said fan carriage, and means for operating said doors.

5. A fruit curing room having a false floor containing a multiplicity of openings permitting the circulation of gases therethrough, an air inlet opening in said room beneath said floor, a stack extending through said floor and projecting upwardly toward the roof of said room, an outlet passage for air in said roof above said stack, a fan movable up and down in said passage and adapted to create an upward draft through said stack when lowered and an upward draft through said outlet passage when raised, means for closing said outlet passage when said fan is lowered, means for closing said air inlet opening to permit the circulation of gases in said room through said floor and stack, and means for closing said stack to permit the circulation of air from said air inlet opening through the floor and out through the outlet passage in said roof when said fan is raised.

BRONSON C. SKINNER.